Aug. 16, 1966   G. J. ANTOSH ET AL   3,266,594
STEP FOR CAMPER BODY VEHICLES
Filed Dec. 17, 1964   2 Sheets-Sheet 1
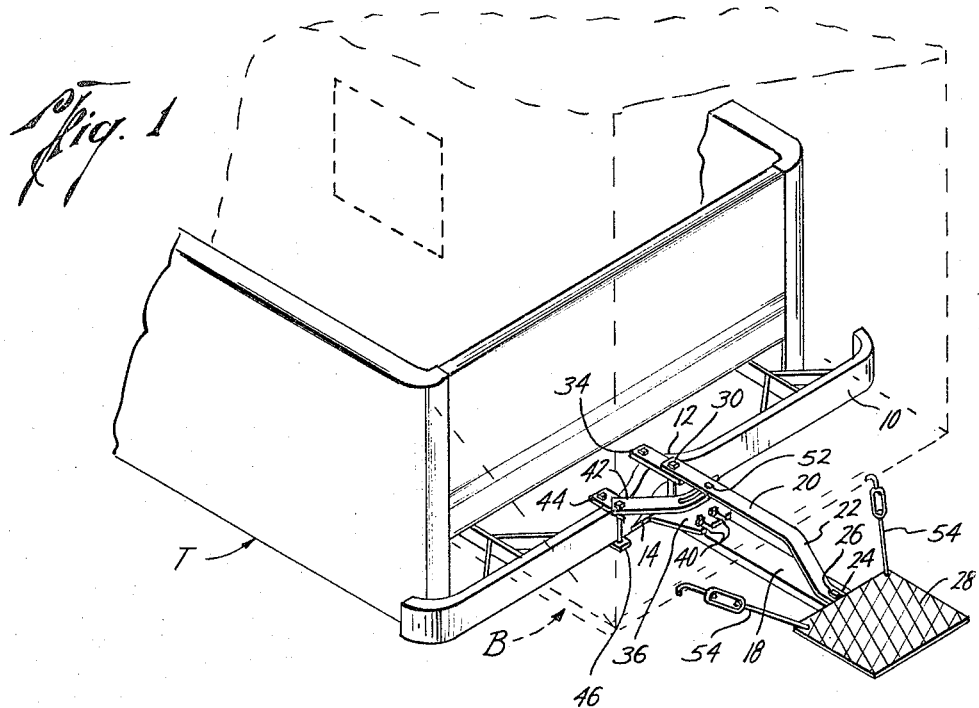
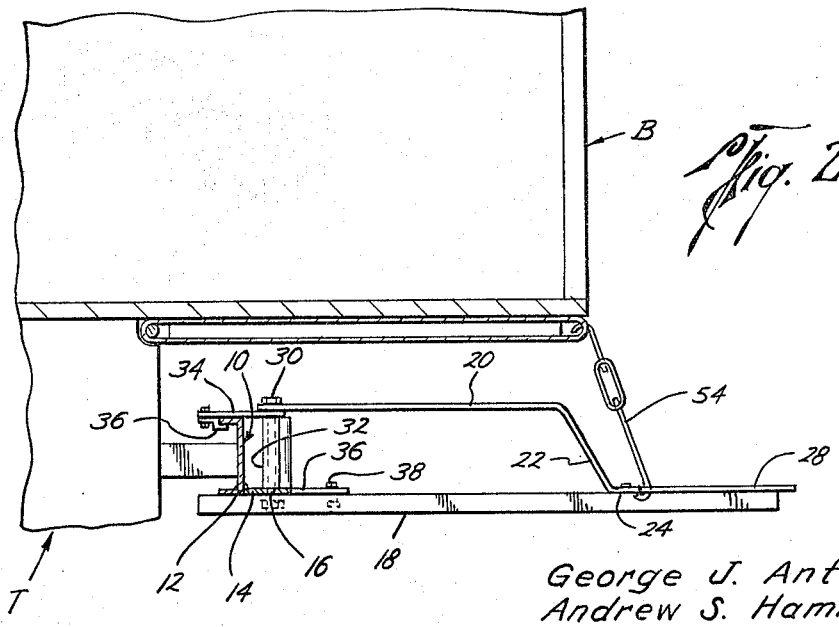
George J. Antosh
Andrew S. Hammons
INVENTORS
BY Charles E. Lightfoot
ATTORNEY

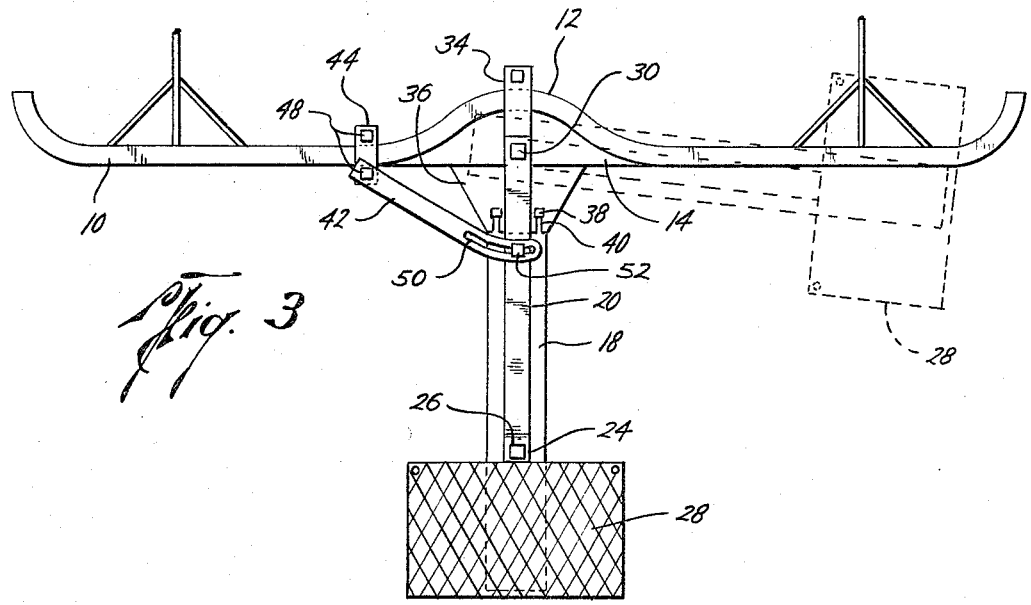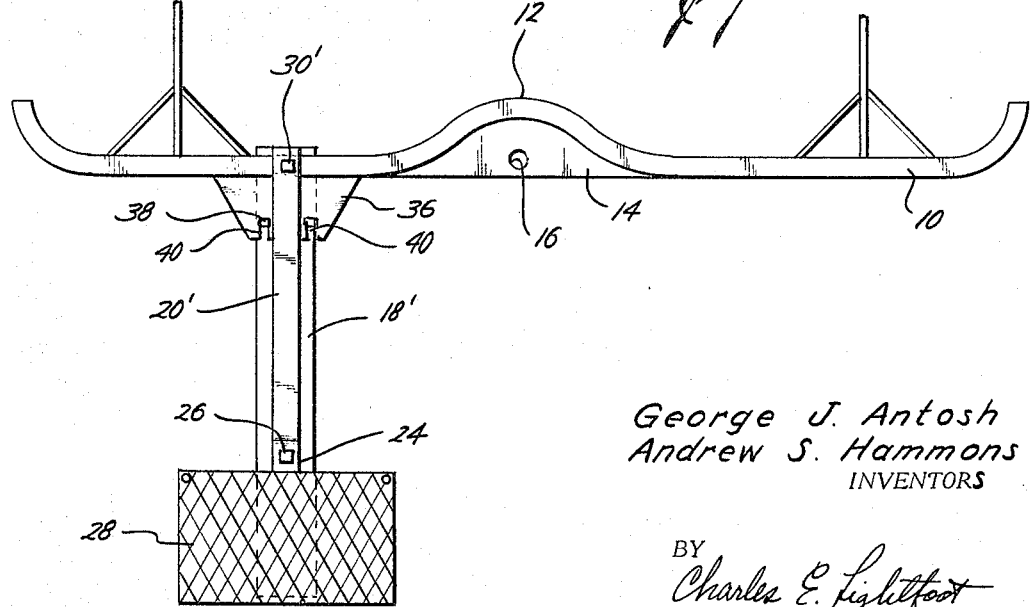

United States Patent Office 3,266,594
Patented August 16, 1966

3,266,594
STEP FOR CAMPER BODY VEHICLES
George J. Antosh, 11725 Biscayne, and Andrew S. Hammons, 1229 Demaret, both of Houston, Tex.
Filed Dec. 17, 1964, Ser. No. 419,000
8 Claims. (Cl. 182—91)

This invention relates to a step for vehicles and more particularly to a step structure adapted to be applied to an automobile, truck or similar vehicle upon which a body in the form of a portable house, commonly known as a "camper" is built or carried.

The invention is capable of use on various kinds of vehicles and finds particular utility in connection with vehicles of the "camper" type wherein the body of the vehicle extends rearwardly beyond the frame of the same and beyond the rear bumper, making it necessary to provide a specially constructed support for the step to position the same for use in entering and leaving the body by a rear door.

As now commonly constructed trucks which are intended for use with camper bodies are also frequently provided with trailer hitches attached to the rear bumper to allow the truck to be used for towing a trailer or for use with a camper body, which ordinarily extends rearwardly beyond the bumper, so that there is no readily available means for the attachment of a step to facilitate ingress and egress through the rear door of the body.

The present invention has for an important object the provision of a step structure adapted to be attached to a vehicle having a body which overhangs the rear bumper of the vehicle to support the step at a location rearwardly of the body for use in entering and leaving the body.

Another object of the invention is to provide a step structure and means for supporting the same, which is designed for attachment to the rear bumper of a vehicle to support the step in an elevated position rearwardly from the body of the vehicle.

A further object of the invention is the provision of a step and supporting structure therefor which may be attached to the bumper of a vehicle with the step positioned rearwardly of the body of the vehicle and which is designed to permit the step to be swung aside to a retracted position beneath the body when desired.

A still further object of the invention is to provide a step structure embodying a supporting frame for attachment to the rear bumper of a vehicle to position the step at a location rearwardly of a camper body carried by the vehicle and having means connecting the step to the body to hold the step against downward movement relative thereto.

The above and other obvious advantages of the invention may best be understood from the following detailed description constituting a specification of the same when considered with the annexed drawings, wherein:

FIGURE 1 is a perspective view illustrating a preferred embodiment of the step and supporting structure of the invention, showing the same attached to the rear bumper of a truck with the step in its extended position;

FIGURE 2 is a side elevational view, partly in cross-section, of the invention as illustrated in FIGURE 1;

FIGURE 3 is a top plan view of the invention as illustrated in FIGURE 1, showing the step in its extended position and also showing in dotted lines, the position of the step when the same is retracted; and FIGURE 4 is a top plan view illustrating a somewhat modified form of the invention.

Referring now to the drawings in greater detail, the invention is illustrated herein in connection with its use on a truck T, upon which a camper body, generally designated B and shown in dotted lines in FIGURE 1, and in solid lines in FIGURE 2, is mounted, the body extending rearwardly beyond the rear bumper 10 with which the truck is provided.

The bumper 10 is of usual construction, of a type which is formed of material of channel shape in cross-section, and having a central forwardly bent portion 12, to which a plate-like element 14 is attached, as by means of welding to form a horizontally extending, central platform, which is perforated as shown at 16, to receive a trailer hitch element of the usual type by which a trailer may be connected to the truck to be towed thereby. In the present illustration the trailer hitch element, referred to, is removed to allow for the attachment of the step supporting structure to the rear bumper.

The step support structure includes a lower bar 18, which may be of any desired cross-sectional shape, such as T-shaped, channel-shaped, or the like, and an upper bar 20, which in the present illustration takes the form of a flat strip-like element, but which may be of other suitable shape in cross-section, and which is bent downwardly adjacent its outer end, as shown at 22, and rebent at its outer end, as seen at 24, for attachment at its outer end to the lower bar 18, as by means of a bolt 26, or otherwise, the outer end of the lower bar extending outwardly beyond the outer end of the upper bar, for the attachment thereto of a step-plate 28, to hold the plate in a substantially horizontal position.

The lower bar 18 extends at its inner end beneath the plate 14 and the bumper 10, and has a perforation which is disposed in registration in the perforation 16 of the plate 14, and through which an attaching bolt 30 may be extended, which bolt extends upwardly through a tubular spacer 32, positioned on the plate 14 and against whose upper end the outer end of an extension link 34 rests. The extension link 34 extends over the bumper 10, in engagement with the upper face thereof, and carries an angle clip 36, attached thereto, which clip is engaged beneath the upper flange of the bumper, to securely clamp the extension link thereto, and the link also extends beneath the inner end of the upper bar 20, the link and upper bar being perforated to receive the bolt 30, whereby the upper and lower bars and the link are securely connected to the bumper. The lower bar 18 is also provided with a stop element 36, of plate-like configuration, which is bolted to the upper surface of the lower bar, as by means of bolts such as that shown at 38, positioned in open ended slots 40 in the stop. The stop member 36 abuts at its inner end against the free edge of the plate 14, to securely hold the support structure against horizontal swinging movement relative to the bumper.

An adjustable brace 42 may be provided, which is pivotally attached at one end to the bumper 10 in laterally spaced relation to the upper bar 20, as by means of upper and lower clip plates 44 and 46, secured in place by bolts 48, and the outer end of the brace is provided with a slotted opening 50, best seen in FIGURE 3, through which a bolt 52 is extended, to adjustably secure the brace to the upper bar, whereby the upper bar is additionally held against horizontal swinging movement.

The step-plate 28 is preferably provided with perforations through which turn-buckle connectors 54 may be extended at their lower ends, which turn-buckles extend upwardly and are connected at their upper ends to the camper body B, at suitable locations, to additionally support the step plate from the body.

The step structure of the invention as constructed and applied as described above will be positioned with the step-plate 28 located somewhat rearwardly of the camper body, in position for use in entering and leaving the body through the usual centrally located rear door thereof, and should it be desired to position the step structure beneath the camper body in a retracted position, the turnbuckles 54 may be released, the bolts 38 removed from the slots 40 of the stop-plate 36, and the bolt 52 removed from the slotted opening 50, whereupon the step and upper and lower support bars may be swung aside by rotation about the bolt 30, to position the step structure beneath the camper body, as shown in FIGURE 3. Thus, when the camper body is removed from the truck, or when it is not desired to use the step, the step structure may be moved to a retracted, out of the way position, from which it may again be moved to its extended position when desired for use.

A somewhat modified form of the invention is illustrated in FIGURE 4 which is intended for use when it is desired to position the step at one side or the other of the longitudinal center of the truck, as when the camper body has a rear door which is positioned at one side or the other of the center, or when the bumper 10 does not have the curved central portion 12 and the plate 14 for the attachment thereto of a trailer hitch.

In this form of the invention the lower support bar 18' extends at its inner end beneath the bumper and the upper support bar 20 extends at its inner end over the bumper and the bars are perforated to receive a bolt 30' which is also extended through perforations in the upper and lower flanges of the bumper to secure the step structure to the bumper. The lower bar 18', in this form of the invention, is similarly provided with the step-plate 36, which is positioned in abutment with the bumper to hold the support structure against horizontal swinging movement.

In other respects the form of the invention illustrated in FIGURE 4 is similar to that illustrated in FIGURES 1 to 3, inclusive, and functions in a similar manner.

It will thus be seen that the invention provides a step for camper body vehicles, which is easily attached to the bumper of a truck or the like, to position the step at a location for easy access in entering or leaving the camper body and which is constructed to permit the step to be readily moved to a retracted position when desired.

The invention is disclosed herein with certain specific embodiments of the same, which it will be understood are intended by way of example only, the structure being capable of various modifications within the spirit of the invention and the scope of the appended claims.

Having thus clearly shown and described the invention, what is claimed as new and desired to secure by Letters Patent is:

1. In a step for attachment to a rear bumper of a vehicle having a body extending rearwardly beyond said bumper to position the step at a location rearwardly of the body, upper and lower elongated support elements, means for connecting the elements to said bumper with the elements extending horizontally rearwardly away from and the forward end of said upper element above and the forward end of the lower element below the bumper and a rear end portion of said lower element extending rearwardly beyond said body, the rear end portion of said upper element being connected to said lower element at a point mediate the ends of said lower element, and a step plate carried on said rear end portion of said lower element.

2. In a step for attachment to a rear bumper of a vehicle having a body extending rearwardly beyond said bumper to position the step at a location rearwardly of the body, upper and lower, vertically spaced, elongated support elements, said upper element having a downwardly bent rear end portion formed at its rear end with a horizontally rebent end portion in engagement with said lower element in forwardly spaced relation to the rear end of the lower element, means for connecting the elements to the bumper with the forward end of the upper element above and the forward end of the lower element below and the elements extending in parallel relation away from said bumper to position the rear end portion of the lower element beyond said body, and a step plate carried by said rear end portion of said lower element.

3. In a step for attachment to a rear bumper of a vehicle having a body extending rearwardly beyond said bumper to position the step at a location rearwardly of the body, upper and lower elongated support elements, means forming a pivotal connection between the elements and the bumper adjacent the forward ends of the elements to support the elements for horizontal swinging movement into and out of a horizontally extending position with the forward end of the upper element above and the forward end of the lower element below and the elements extending rearwardly away from the bumper and the rear end portion of the lower element located rearwardly beyond said body, the rear end portion of said upper element being connected to said lower element at a point mediate the ends of said lower element, means positioned for coaction with said bumper and elements to hold the elements against horizontal swinging movement away from said position and a step plate carried on said rear end portion of said lower element.

4. In a step for attachment to a rear bumper of a vehicle having a body extending rearwardly beyond said bumper to position the step at a location rearwardly of the body, upper and lower elongated support elements, means for connecting the elements to said bumper with the elements extending horizontally rearwardly away from and the forward end of said upper element above and the forward end of the lower element below the bumper and a rear end portion of said lower element extending rearwardly beyond said body, the rear end portion of said upper element being connected to said lower element at a point mediate the ends of said lower element, a step plate carried on said rear end portion of said lower element and means forming a connection between said plate and the rear end portion of the body.

5. In a step for attachment to a rear bumper of a vehicle having a body extending rearwardly beyond said bumper to position the step at a location rearwardly of the body, upper and lower, vertically spaced, elongated support elements, said upper element having a downwardly bent rear end portion formed at its rear end with a horizontally rebent end portion in engagement with said lower element in forwardly spaced relation to the rear end of the lower element, means for connecting the elements to the bumper with the forward end of the upper element above and the forward end of the lower element below and the elements extending in parallel relation away from said bumper to position the rear end portion of the lower element beyond said body, a step plate carried on said rear end portion of said lower element and means for supporting said plate from the rear end portion of said body.

6. In a step for attachment to a rear bumper of a vehicle having a body extending rearwardly beyond said bumper to position the step at a location rearwardly of the body, upper and lower elongated support elements, means forming a pivotal connection between the elements and the bumper adjacent the forward ends of the elements to support the elements for horizontal swinging movement into and out of a horizontally extending position with the forward end of the upper element above and the forward end of the lower element below and the elements extending rearwardly away from the bumper and the rear end portion of the lower element located rearwardly beyond said body, the rear end portion of said upper element being connected to said lower element at a point mediate the ends of said lower element, means positioned for coaction with said bumper and elements to hold the elements against horizontal swinging movement away from said position, a step plate carried on said rear end portion of said lower element, and means for connecting said plate to the rear end portion of the body to hold the plate against vertical movement relative to the body.

7. In a step for attachment to a rear bumper of a vehicle having a body extending rearwardly beyond said bumper to position the step at a location rearwardly of the body, upper and lower elongated support elements, a tubular spacer positioned between the forward end portions of said elements, means positioned for coaction with said spacer and bumper to form a pivotal connection between the elements and bumper with the forward end of said upper element above and the forward end of said lower element below the bumper to allow the elements to swing horizontally into and out of a position extending rearwardly away from the bumper with the rear end portion of said lower element extending beyond the body, the rear end portion of said upper element being connected to said lower element at a point mediate the ends of said lower element, releasable means positioned for coaction with the elements and bumper to hold the elements against horizontal swinging movement away from said position, and a step plate carried by said rear end portion of said lower element.

8. In a step for attachment to a rear bumper of a vehicle having a body extending rearwardly beyond said bumper to position the step at a location rearwardly of the body, upper and lower elongated support elements, a tubular spacer positioned between the forward end portions of said elements, means positioned for coaction with said spacer and bumper to form a pivotal connection between the elements and bumper with the forward end of said upper element above and the forward end of said lower element below the bumper to allow the elements to swing horizontally into and out of a position extending rearwardly away from the bumper with the rear end portion of said lower element extending beyond the body, the rear end portion of said upper element being connected to said lower element at a point mediate the ends of said lower element, releasable means positioned for coaction with the elements and bumper to hold the elements against horizontal swinging movement away from said position, a step plate carried by said rear end portion of said lower element and means forming a connection between the step plate and said body to hold the plate against vertical movement away from the body.

References Cited by the Examiner

UNITED STATES PATENTS

| | | | |
|---|---|---|---|
| 701,050 | 5/1902 | Keeran | 182—91 X |
| 817,969 | 4/1906 | Galbraith | 182—91 X |
| 2,566,401 | 9/1951 | Bustin | 182—91 |
| 3,159,242 | 12/1964 | James | 182—92 |

REINALDO P. MACHADO, *Primary Examiner.*